US009092312B2

(12) United States Patent
Meaney et al.

(10) Patent No.: US 9,092,312 B2
(45) Date of Patent: Jul. 28, 2015

(54) SYSTEM AND METHOD TO INJECT A BIT ERROR ON A BUS LANE

(71) Applicant: International Business Machines Corporation, Armonk, NY (US)

(72) Inventors: Patrick J. Meaney, Poughkeepsie, NY (US); Michael B. Spear, Round Rock, TX (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 13/714,531

(22) Filed: Dec. 14, 2012

(65) Prior Publication Data

US 2014/0173361 A1    Jun. 19, 2014

(51) Int. Cl.
*G06F 11/00* (2006.01)
(52) U.S. Cl.
CPC .................................. *G06F 11/004* (2013.01)
(58) Field of Classification Search
CPC ... G06F 11/004; G01R 11/17; G01R 27/2605
USPC .................................................. 714/41, 47.2
See application file for complete search history.

(56) References Cited

U.S. PATENT DOCUMENTS

| 4,999,837 | A | 3/1991 | Reynolds et al. |
| 6,134,684 | A | 10/2000 | Baumgartner et al. |
| 6,519,718 | B1 * | 2/2003 | Graham et al. ................. 714/41 |
| 6,880,112 | B2 | 4/2005 | Lajolo |
| 6,914,944 | B1 | 7/2005 | Nokkonen et al. |
| 7,020,803 | B2 | 3/2006 | Wolin et al. |
| 7,519,886 | B2 * | 4/2009 | Tsao et al. .................... 714/733 |
| 7,669,095 | B2 | 2/2010 | Clark et al. |
| 8,140,920 | B2 | 3/2012 | Kotrla et al. |
| 2004/0034820 | A1 * | 2/2004 | Soltis et al. ..................... 714/47 |
| 2007/0208977 | A1 * | 9/2007 | Clark et al. ................... 714/728 |
| 2011/0099426 | A1 | 4/2011 | Jibbe et al. |
| 2011/0239048 | A1 * | 9/2011 | Andrade et al. ................ 714/35 |
| 2011/0320872 | A1 * | 12/2011 | Bair et al. ....................... 714/35 |
| 2012/0151247 | A1 | 6/2012 | Ferraiolo et al. |

* cited by examiner

*Primary Examiner* — Bryce Bonzo
*Assistant Examiner* — Elmira Mehrmanesh
(74) *Attorney, Agent, or Firm* — Toler Law Group

(57) ABSTRACT

A method includes modifying, at a bit error injection circuit, a multiplier value by a first value according to an occurrence of a first event. The method also includes, in response to a determination that the modified multiplier value matches a first threshold, modifying, at the bit error injection circuit, the offset value according to an occurrence of a second event. The method further includes, in response to a determination that the modified offset value matches a second threshold, asserting, at the bit error injection circuit, an error injection signal. The method further includes asserting a first error pattern to be transmitted via a bus lane based on the error injection signal.

20 Claims, 8 Drawing Sheets

Injection State Machine Truth Table

| Operation State | Interrupt | CNT (0:4) = 00000 | CNT_Next | Next Operation State | Error Injection Signal |
|---|---|---|---|---|---|
| 0 | 0 | 0 | CNT | 0 | 0 |
| 0 | 0 | 1 | CNT | 0 | 0 |
| 0 | 1 | 0 | CNT-1 | 1 | 0 |
| 0 | 1 | 1 | Offset | 1 | 0 |
| 1 | 0 | 0 | CNT-1 | 0 | 0 |
| 1 | 0 | 1 | Multiplier | 1 | 1 |
| 1 | 1 | 0 | CNT-1 | 1 | 0 |
| 1 | 1 | 1 | Multiplier | 0 | 1 |

First Operation State: rows with Operation State = 0
Second Operation State: rows with Operation State = 1

FIG. 5

Multiplier Variation Select Table

| 602 | 604 | 606 |
|---|---|---|
| 0010 | 01100 - 10011 | r(0) & !r(0) & !r(0) & r(3:4) |
| 0011 | 01110 - 10001 | r(0) & !r(0) & !r(0) & !r(0) & r(4) |
| 0100 | 01111 - 10000 | r(0) & !r(0) & !r(0) & !r(0) & !r(0) |
| 0101 | 00000 - 00111 | "00" & r(2:4) |
| 0110 | 00010 - 00101 | "00" & r(2) & !r(2) & r(4) |
| 0111 | 00011 - 00100 | "00" & r(2) & !r(2) & !r(2) |
| 1000 | 00000 - 00000 | "00000" |
| 1001 | 00010 - 00010 | "00010" |
| 1010 | 00100 - 00100 | "00100" |
| 1011 | 00101 - 00101 | "00101" |
| 1100 | 00110 - 00110 | "00110" |
| 1101 | 10000 - 10000 | "10000" |
| 1110 | 10100 - 10100 | "10100" |
| 1111 | 11000 - 11000 | "11000" |

Pseudo-random multiplier value: columns 604 and upper portion of 606
Non-pseudo-random multiplier value: lower portion of 606

Offset Variation Select Table 700

| Offset Value Selection Input 702 | Offset Value Range 704 | Offset Value Decode 706 |
|---|---|---|
| 000 | 00000 - 11111 | r(0:4) |
| 001 | 00000 - 01111 | "0" & r(1:4) |
| 010 | 00000 - 00111 | "00" & r(2:4) |
| 011 | 00000 - 00011 | "000" & r(3:4) |
| 100 | 00000 - 00001 | "0000" & r(4) |
| 101 | 00000 - 00000 | "00000" |
| 110 | 00010 - 00010 | "00010" |
| 111 | 00110 - 00110 | "00110" |

Pseudo-random offset value: rows 000–100
Non-pseudo-random offset value: rows 101–111

US 9,092,312 B2

SYSTEM AND METHOD TO INJECT A BIT ERROR ON A BUS LANE

FIELD OF THE DISCLOSURE

The present disclosure is generally related to bit error injection.

BACKGROUND

A computer module of a computer system may transmit data to another computer module of the computer system via a high speed bus lane. The computer system may include repair logic configured to detect and repair defects of the high speed bus lane. The repair logic may use stuck-at faults (e.g., stuck-at 1, stuck-at 0) to test whether an error exists in a bus lane. However, in modern high speed buses, a bus lane may be considered non-defective when an associated bit error rate is below a threshold (e.g., one bit error in every trillion bits).

SUMMARY

In a particular embodiment, a method includes modifying, at a bit error injection circuit, a multiplier value by a first value according to an occurrence of a first event. The method also includes, in response to a determination that the modified multiplier value matches a first threshold, modifying, at the bit error injection circuit, an offset value according to an occurrence of a second event. The method further includes, in response to a determination that the modified offset value subset matches a second threshold, asserting, at the bit error injection circuit, an error injection signal. The method further includes asserting a first error pattern to be transmitted via a bus lane based on the error injection signal.

In another particular embodiment, an apparatus includes a bit error injection circuit. The bit error injection circuit is configured to modify a multiplier value by a first value according to an occurrence of a first event. The bit error injection circuit is also configured to, in response to a determination that the modified multiplier value matches a first threshold, modify an offset value according to an occurrence of a second event. The bit error injection circuit is further configured to assert an error injection signal in response to a determination that the modified offset value subset matches a second threshold and to assert a first error pattern to be transmitted in a bus lane based on the error injection signal.

BRIEF DESCRIPTION OF THE DRAWINGS

FIG. 5 is a diagram to illustrate a particular embodiment of a truth table of an injection state machine of the first bit error injection circuit of FIG. 3;

FIG. 6 is a diagram to illustrate a particular embodiment of a look up table of the injection state machine of FIG. 3 to determine a multiplier value;

FIG. 7 is a diagram to illustrate a particular embodiment of a look up table of the injection state machine of FIG. 3 to determine an offset value.

DETAILED DESCRIPTION

A non-functional bus lane with an unacceptable bit error rate may not be distinguished from a functional bus lane with an acceptable bit error rate when a bit error rate (BER) (e.g., a number of errors divided by a time interval) of a bus lane is not taken into account during testing. A receiver defect detection and correction circuit may detect a non-functional bus lane based on a BER of the non-functional bus lane and repair defects caused by the non-functional bus lane. Systems and methods described herein may test whether a receiver defect detection and correction circuit can detect a non-functional bus lane using different BERs.

Figure 1:
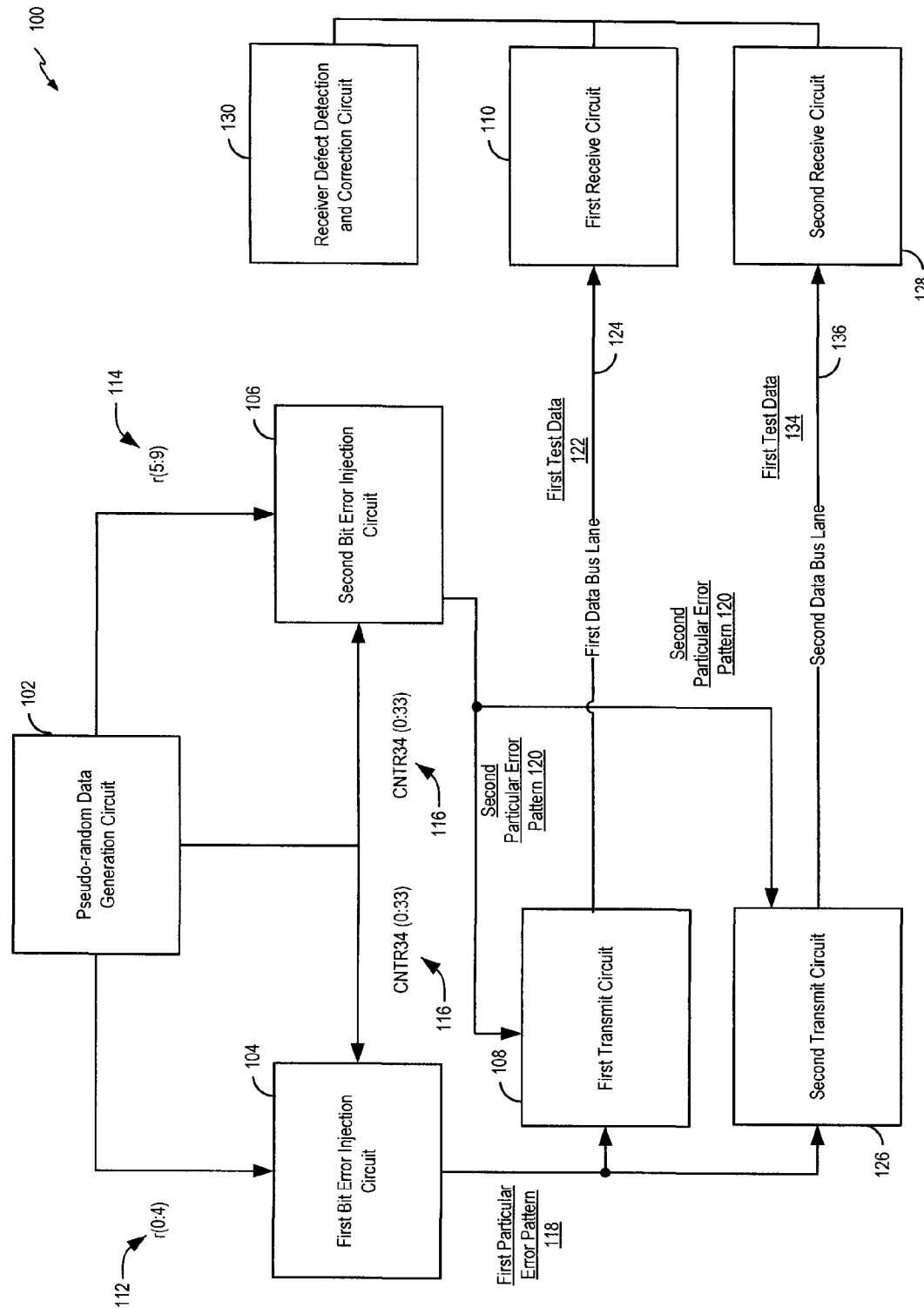
FIG. 1 is a diagram to illustrate a particular embodiment of a system operable to test a bus lane using different bit error rates.

Referring to FIG. 1, a particular embodiment of a system 100 operable to test a bus lane using different bit error rates is illustrated. The system 100 may include a pseudo-random data generation circuit 102, a first bit error injection circuit 104, a second bit error injection circuit 106, a first transmit circuit 108, a first receive circuit 110, a second transmit circuit 126, a second receive circuit 128, a receiver defect detection and correction circuit 130. The pseudo-random data generation circuit 102, the first bit error injection circuit 104, the second bit error injection circuit 106, the first transmit circuit 108, and the first receive circuit 110 may be electronic circuits.

The pseudo-random data generation circuit 102 may be coupled to the first bit error injection circuit 104 and to the second bit error injection circuit 106. The first transmit circuit 108 may be coupled to the first bit error injection circuit 104 and to the second bit error injection circuit 106. The first transmit circuit 108 may also be coupled to the first receive circuit 110. The second transmit circuit 126 may be coupled to the second receive circuit 128. The first receive circuit 110 and the second receive circuit 128 may be coupled to the receiver defect detection and correction circuit 130. The receiver defect detection and correction circuit 130 may be configured to detect and correct errors in data received by the first receive circuit 110 and/or the second receive circuit 128. In a particular embodiment, the receiver defect detection and correction circuit 130 performs an error correcting code (ECC) check on data received by the first receive circuit 110 and/or the second receive circuit 128. In a particular embodiment, the receiver defect detection and correction circuit 130 performs a cyclic redundancy check (CRC) on data received by the first receive circuit 110 and/or the second receive circuit 128. In a particular embodiment, the first bit error injection circuit 104 and the second bit error injection circuit 106 are each coupled to separate pseudo-random data generation circuits instead of to the common pseudo-random data generation circuit 102.

During operation, the pseudo-random data generation circuit 102 may supply (e.g., electrically) to the first bit error injection circuit 104 a first portion 112 of a pseudo-random number (e.g., bits 0-4 of a pseudo-random binary number "r") and a counter output 116. The pseudo-random data generation circuit 102 may also supply a second portion 114 of the pseudo-random number (e.g., bits 5-9 of "r") and the counter output 116 to the second bit error injection circuit 106. The first bit error injection circuit 104 may generate and supply a first particular error pattern 118 based on the first portion 112 of the pseudo-random number and the counter output 116 to the first transmit circuit 108. The first particular error pattern 118 may have a first BER. Similarly, the second bit error injection circuit 106 may generate and supply a second particular error pattern 120 based on the second portion 114 of the pseudo-random number and the counter output 116 to the first transmit circuit 108. The second particular error pattern 120 may have a second BER. In a particular embodiment, the first BER is different than the second BER.

The first bit error injection circuit 104 may control the first BER such that the first particular error pattern 118 may be injected on the first bus lane 124 and/or the second bus lane 136 at different intervals to cover different failure scenarios. The first BER may be controlled by adjusting a first associated multiplier value and a first associated offset value. Similarly, the second bit error injection circuit 106 may control the second BER such that the second particular error pattern 120 may be injected on the first bus lane 124 and/or the second bus lane 136 at different intervals to cover different failure scenarios. The second BER may be controlled by adjusting a second associated multiplier value and a second associated offset value.

For example, the first transmit circuit 108 may transmit data with bits inverted coincident with logical ones in the first particular error pattern 118 and/or the second particular error pattern 120 as first test data 122 to the first receive circuit 110 via a first bus lane 124, such that the first bus lane 124 may be tested using the first test data 122. Similarly, the second transmit circuit 126 may transmit data with bits inverted coincident with logical ones in the first particular error pattern 118 and/or the second particular error pattern 120 as second test data 134 via a second bus lane 136, such that the second bus lane 136 may be tested using the second test data 134. The first particular error pattern 118 and the second particular error pattern 120 may be injected on the first bus lane 124 and/or the second bus lane 136 in different combinations (e.g., via different enable signals) and with different BERs to test the functionality of the receiver defect detection and correction circuit 130. Thus, the system 100 may enable testing of a receiver defect detection and correct circuit using different BERs.

Figure 2:
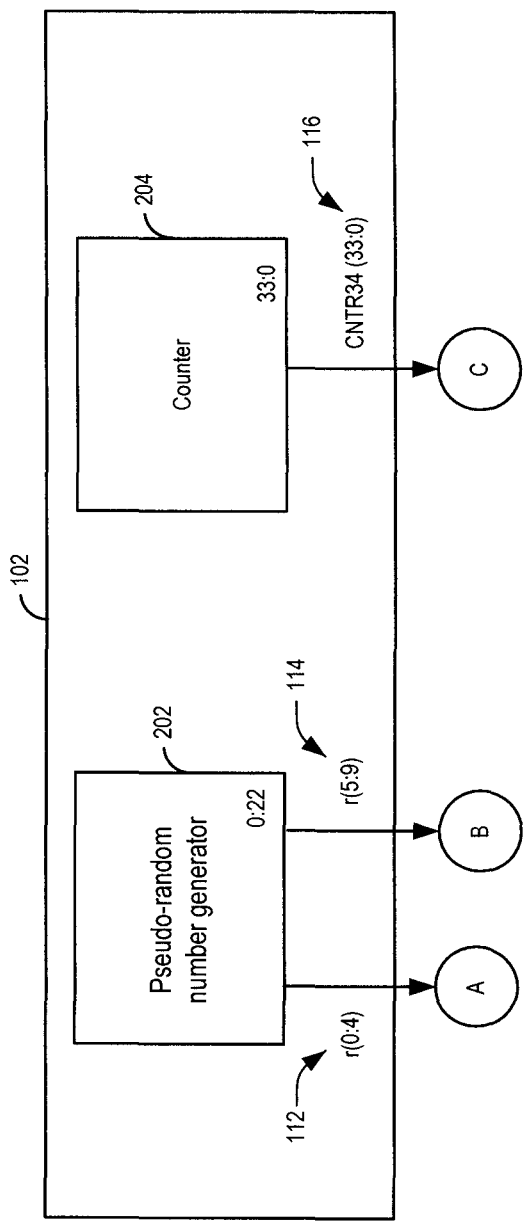
FIG. 2 is a diagram to illustrate a particular embodiment of a pseudo-random data generation circuit of the system of FIG. 1.

Referring to FIG. 2, a particular embodiment of the pseudo-random data generation circuit 102 of FIG. 1 is illustrated. The pseudo-random data generation circuit 102 may include a pseudo-random number generator 202 and a counter 204. In a particular embodiment, the pseudo-random number generator 202 is a 23-bit linear shift feedback register. In a particular embodiment, the counter 204 is a 34-bit binary counter In FIG. 2, indicator "A" represents a connection from the pseudo-random number generator 202 to the first bit error injection circuit 104. Indicator "B" represents a connection from the pseudo-random number generator 202 to the second bit error injection circuit 106. Indicator "C" represents a connection from the counter 204 to the first bit error injection circuit 104 and to the second bit error injection circuit 106. Indicators "A," "B," and "C" appear in FIGS. 3 and 4 to illustrate the system 100.

During operation, the pseudo-random number generator 202 may supply the first portion 112 of the pseudo-random number to the first bit error injection circuit 104 of FIG. 1. In a particular embodiment, the first portion 112 of the pseudo-random number is the first five bits (bits 0 to 4) of a 23-bit output of a linear shift feedback register. The pseudo-random number generator 202 may also supply the second portion 114 of the pseudo-random number to the second bit error injection circuit 106 of FIG. 1. In a particular embodiment, the second portion 114 of the pseudo-random number is the next 5 bits (e.g., bits 5 to 9) of the 23-bit output of the linear shift feedback register.

The counter 204 may supply the counter output 116 to the first bit error injection circuit 104 and the second bit error injection circuit 106. In a particular embodiment, the counter output 116 is a 34-bit binary number that is output in reverse bit order (e.g., bit 33 or the least significant bit is the first bit of the 34-bit binary number). The counter 204 may modify the counter output 116 according to an occurrence of an event. For example, the counter 204 may supply the counter output 116 in a particular clock cycle. The counter 204 may then decrement or increment the counter output 116 by a particular value (e.g., decrement by 1) before supplying the counter output 116 (that has been modified) in a subsequent clock cycle. When the counter output 116 matches a particular threshold (e.g., 0), the counter 204 may reset the counter output 116 to a particular starting value and modify the counter output 116 according to the occurrence of the event for subsequent iterations.

Figure 3:
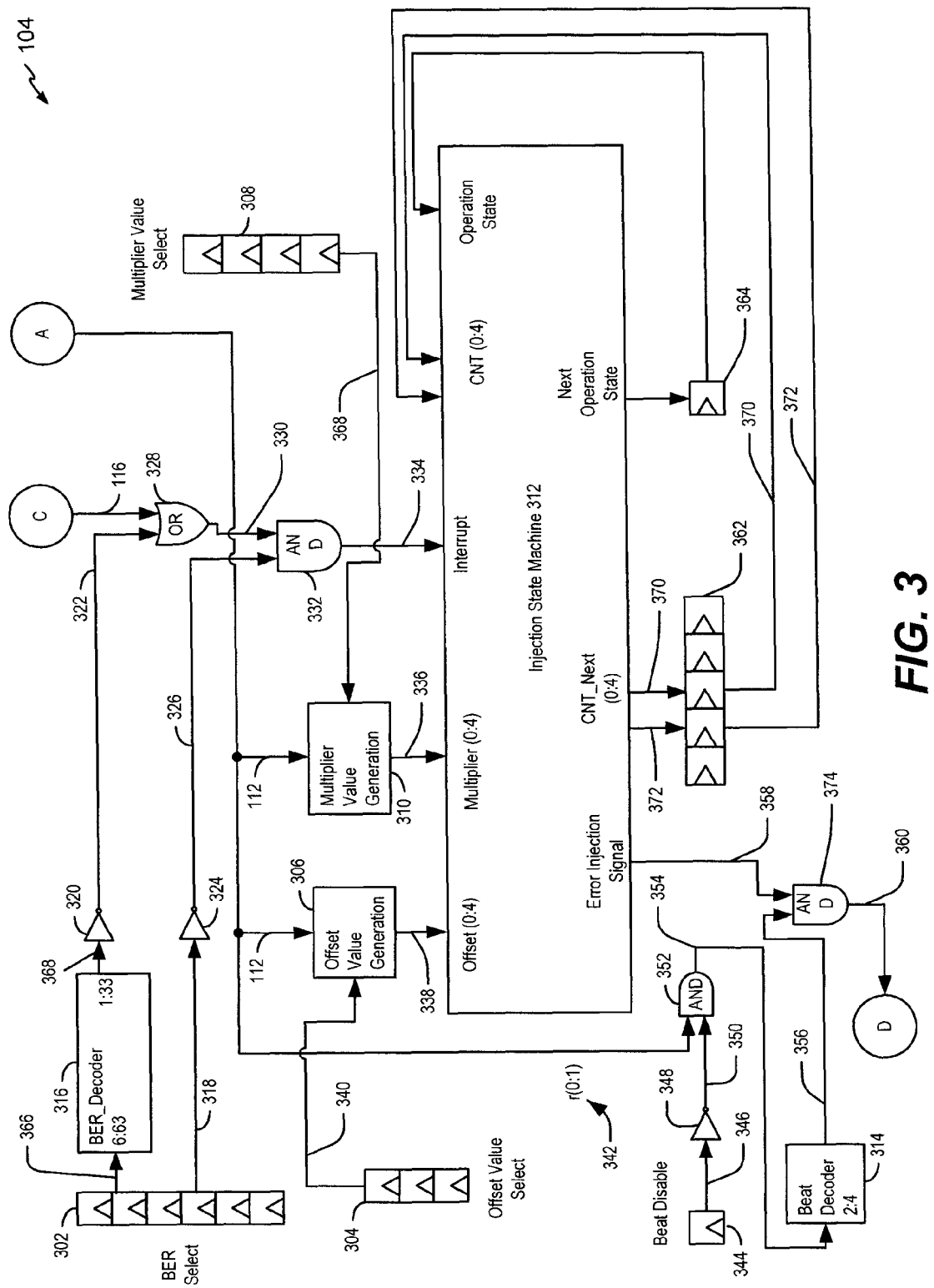
FIG. 3 is a diagram to illustrate a particular embodiment of a first bit error injection circuit of the system of FIG. 1.

Referring to FIG. 3, a particular embodiment of the first bit error injection circuit 104 is illustrated. The first bit error injection circuit 104 may include a bit error rate (BER) selection input circuit 302, a BER decoder 316, an offset value selection input circuit 304, an offset value generation circuit 306, a multiplier value selection input circuit 308, a multiplier value generation circuit 310, an injection state machine 312, and a beat decoder 314. The injection state machine 312 may include electronic circuit(s). The BER selection input circuit 302, the offset value selection input circuit 304, and the multiplier value selection input circuit 308 may include programmable registers. In a particular embodiment, the BER selection input circuit 302 includes a 6 bit register. In a particular embodiment, the offset value selection input includes a 3 bit register. In a particular embodiment, the multiplier value selection input circuit 308 includes a 4 bit register.

As shown in FIG. 3, the BER selection input circuit 302 may be coupled to the BER decoder 316. The offset value selection input circuit 304 may be coupled to the offset value generation circuit 306. The multiplier value selection input circuit 308 may be coupled to the multiplier value generation circuit 310. The injection state machine 312 may be coupled to the offset value generation circuit 306 and to the multiplier value generation circuit 310.

During operation, the injection state machine 312 may receive a multiplier value 336, an offset value 338, and an interrupt 334 to assert an error injection signal 358. The multiplier value 336 may be generated at the multiplier value generation circuit 310 according to a multiplier value selection input 368 and the first portion 112 of the pseudo-random number. The multiplier value selection input circuit 308 may supply the multiplier value selection input 368 to the multiplier value generation circuit 310. The multiplier value selection input 368 may be stored (e.g., programmed) in the multiplier value selection input circuit 308 by an external source (e.g., a user). As illustrated by the common indicator "A" in FIGS. 2 and 3, the pseudo-random number generator 202 may supply the first portion 112 of the pseudo-random number to the multiplier value generation circuit 310. The multiplier value generation circuit 310 may apply different decoding functions to the first portion 112 of the pseudo-random number based on the multiplier value selection input 368 to generate the multiplier value 336. The multiplier value generation circuit 310 may supply the multiplier value 336 to the injection state machine 312. Operation of the multiplier value generation circuit 310 is further described with reference to FIG. 6.

The offset value 338 may be generated at the offset value generation circuit 306 according to an offset value selection input 340 and the first portion 112 of the pseudo-random number of the pseudo-random number. The offset value selection input circuit 304 may supply the offset value selection value 340 to the offset value generation circuit 306. The offset value selection input 340 may be stored (e.g., programmed) in the offset value selection input circuit 304 by the external source (e.g., a user). As illustrated by the common indicator "A" in FIGS. 2 and 3, the pseudo-random number generator 202 may supply the first portion 112 of the pseudo-random number to the offset value generation circuit 306. The offset value generation circuit 306 may apply different decoding functions to the first portion 112 of the pseudo-random number based on the offset value selection input 340 to generate the offset value 338. The offset value generation circuit 306 may then supply the offset value 338 to the injection state machine 312. Operation of the offset value generation circuit 306 is further described with reference to FIG. 7.

The interrupt 334 may be asserted based on the counter output 116 and a BER selection input 366. The BER selection input circuit 302 may supply the BER selection input 366 to the BER decoder 316. In a particular embodiment, the BER decoder 316 is a 6-to-64 thermometer code decoder. For example, when the BER selection input 366 is 000111 in binary format, the BER decoder 316 may decode the 000111 in binary format as 0xFE00_0000_0000_0000 in hexadecimal format. The BER decoder 316 may output bits 1 (e.g., the second bit) to 33 (e.g., the last bit) of a decoded BER selection input as a decoded BER selection value 368 based on the BER selection input 366. The decoded BER selection value 368 may be inverted by a first inverter 320 and an output from the first inverter 320 may form a mask signal 322. Bit 0 of the BER selection value 368 may be unused. The BER decoder 316 may be programmed to not invert all of the bits of the decoded BER selection input to be inverted by the first inverter 320 because the interrupt 334 may not occur on every clock cycle.

A first OR gate 328 may perform a masking operation on the counter output 116 using the mask signal 322. The first OR gate 328 may process the mask signal 322 and the counter output 116 in accordance with a corresponding bit order of the mask signal 322 and the counter output 116. For example, the first OR gate 328 may process bit 0 of the mask signal 322 with bit 33 of the counter output 116, bit 1 of the mask signal 322 with bit 32 of the counter output 116, etc. as bit 33 of the counter output 116 may be the least significant bit of the counter output 116. As a result of the masking operation, the first OR gate 328 may output a masked counter output 330. The masked counter output 330 may be provided as an input to a first AND gate 332. An inverted interrupt disable signal 326 may be provided as another input to the first AND gate 332. The first AND gate 332 may assert the interrupt 334 (e.g., a logic high or 1) based on the masked counter output 330 and the inverted interrupt disable signal 326, the generation of which is further described below. When the interrupt 334 is not to be asserted, the BER selection input circuit 302 may assert an interrupt disable signal 318 having a particular logic value according to the BER selection input 366 (e.g., when the BER selection input 366 is 000000). For example, the interrupt disable signal 318 may be a logic high or 1. The interrupt disable signal 318 may be inverted by a second inverter 324 to generate the inverted interrupt disable signal 326. In a particular embodiment, the inverted interrupt disable signal 326 corresponds to a first logical value (e.g., a logic low or 0) when the interrupt 334 is not to be asserted and the inverted interrupt disable signal 326 corresponds to a second logical value (e.g., a logic high or 1) when the interrupt 334 is to be asserted. Thus, when the inverted interrupt disable signal 326 has the first logical value, the first AND gate 332 may output a logic low irrespective of the masked counter output 330.

When the injection state machine 312 receives the offset value 338 and the multiplier value 336, the injection state machine 312 may modify the multiplier value 336 until the multiplier value 336 matches a first threshold. The injection state machine 312 may also modify the offset value 338 until the offset value 338 matches a second threshold. After the offset value 338 matches the second threshold, the injection state machine 312 may assert the error injection signal 358.

For example, the injection state machine 312 may load the multiplier value 336 into a value register 362 (e.g., a 5-bit register) and modify the multiplier value 336 by a first value (e.g., decrement by 1 or increment by 1) according to (e.g., in response to) an occurrence of a first event (e.g., receiving the interrupt 334) until the multiplier value 336 matches the first threshold. In a particular embodiment, when the injection state machine 312 receives the interrupt 334, the injection state machine 312 may determine whether the multiplier value 336 matches the first threshold (e.g., 0) and decrement the multiplier value 336 by 1 when the multiplier value 336 is not equal to 0. After modifying the multiplier value 336, the injection state machine 312 may load the multiplier value 336 as a modified multiplier value 372 into the value register 362 for use in a subsequent determination. When the injection state machine 312 receives a subsequent interrupt, the modified multiplier value 372 may be loaded back into the injection state machine 312 as the multiplier value 336. The injection state machine 312 may then determine whether the multiplier value 336 matches the first threshold. This process may continue until the multiplier value 336 matches the first threshold.

After injection state machine 312 determines that the multiplier value 336 matches the first threshold, the injection state machine 312 may load the offset value 338 into the internal register. The injection state machine 312 may determine whether the offset value 338 matches the second threshold (e.g., 0) and modify the offset value 338 by a second value (decrement by 1 or increment by 1) according to (e.g., in response to) an occurrence of a second event (e.g., a system clock cycle) when the offset value 338 does not match the second threshold. In a particular embodiment, the second event is independent of the first event. For example, the injection state machine 312 may modify the offset value 338 every clock cycle irrespective of the interrupt 334. In a particular embodiment, the injection state machine 312 decrements the offset value by 1 on every system clock cycle until the offset value 338 matches the second threshold.

After modifying the offset value 338, the injection state machine 312 may load the offset value 338 as a modified offset value 372 into the value register 362 for a subsequent determination. On a subsequent clock cycle, the modified offset value 372 is loaded into the injection state machine 312 as the offset value 338, and the injection state machine 312 may determine whether the offset value 338 matches the second threshold. This process may continue until the offset value 338 matches the second threshold. When the offset value 338 matches the second threshold, the injection state machine 312 may assert the error injection signal 358 and load a subsequent multiplier value and a subsequent offset value for the next iteration.

The injection state machine 312 may be in a first operation state when determining whether the multiplier value 336 matches the first threshold and in a second operation state when determining whether the offset value 338 matches the second threshold. The injection state machine 312 may keep track of which operation state the injection state machine 312 is in by using a state register 364. The state register 364 may have an initial value (e.g., 0) that corresponds to the first operation state during which injection state machine 312 modifies the multiplier value 336 until the multiplier value 336 reaches the first threshold.

While the injection state machine 312 is in the first operation state and the multiplier value 336 does not match the first threshold, the injection state machine 312 may not update the state register 364. When the injection state machine 312 determines that the multiplier value 336 matches the first threshold, the injection state machine 312 may update the state register 364 to an updated value (e.g., 1) that corresponds to the second operation state. When the injection state machine 312 determines the offset value 338 matches the second threshold, the injection state machine 312 may update the state register 364 back the initial value (e.g., 0) for a subsequent iteration.

When the error injection signal 358 is asserted, a first error pattern 360 having a first BER may be injected into the bus lane 124 of FIG. 1 via the first transmit circuit 108 based on a particular beat of the system clock cycle. The particular beat may correspond to a particular bit of data, clocked on each system clock cycle, to be transmitted. For example, the first transmit circuit 108 may include a parallel-to-serial conversion interface. The first transmit circuit 108 may convert data having multiple bits in parallel format to serial format before transmitting the serialized data via the first data bus lane 124 one bit at a time. The receive circuit 110 may receive the serialized data and convert the serialized data back to data in parallel format. On each system clock cycle, a particular number of bits of data may be converted to serial format. Each bit of data that is converted to serial format on a clock cycle may be referred to as a beat.

The particular beat may be selected based on a beat disable signal 346 and a pseudo-random value 342 when the beat disable signal 346 is logic low (e.g., 0). When the beat disable signal 346 is logic high (e.g., 1), the first beat of the system clock cycle may be selected. In a particular embodiment, the pseudo-random value 342 is the first two bits of the first portion 112 of the pseudo-random number. Thus, the pseudo-random value 342 may be supplied by pseudo-random number generator 202. A beat disable register 344 may supply the beat disable signal 346. In a particular embodiment, the beat disable register 344 is a programmable register. The beat disable signal 346 may be inverted by a third inverter 348 to form an inverted beat disable signal 350. The pseudo-random value 342 and the inverted beat disable signal 350 may pass through a second AND gate 352 to form a beat selection signal 354. In a particular embodiment, the beat selection signal 354 is a 2 bit binary number.

The beat selection signal 354 may be decoded by the beat decoder 314. In a particular embodiment, the beat decoder 314 is a 2-to-4 decoder. The beat decoder 314 may output a decoded beat selection signal 356. The decoded beat selection signal 356 and the error injection signal 358 may be processed by a third AND gate 374 to assert the first error pattern 360 (e.g., to be transmitted by the first transmit circuit 108 of FIG. 1). Indicator "D" represents a connection from first bit error injection circuit 104 to the first transmit circuit 108. The indicator "D" appears in FIGS. 3 and 4 to illustrate the first bit error injection circuit 104. Thus, by controlling the amount of time used modifying the multiplier value 336 and modifying the offset value 338, the first BER may be controlled to test whether the receiver defect detection and correction circuit 130 of FIG. 1 can properly detect an unacceptable BER.

Although components of the first bit error injection circuit 104 are shown in FIG. 3, the second error bit injection circuit 106 of FIG. 1 may have substantially similar structures and/or modules as the first bit error injection circuit 104. The second bit error injection circuit 106 may generate a second multiplier value based on a second multiplier value selection input and the second portion 114 of the pseudo-random number. The second multiplier value selection input may be asserted by a second multiplier value selection input circuit. The second bit error injection circuit 106 may modify the second multiplier value by a second value (e.g., decrement by 1 or increment by 1) according to an occurrence of a third event (e.g., a particular interrupt that is different than the interrupt 334) via a second injection state machine. The second bit error injection circuit 106 may generate a second offset value based on a second offset value selection input and the second portion 114 of the pseudo-random number. The second offset value selection input may be asserted by a second offset value selection input circuit.

The second bit error injection circuit 106 may, in response to a determination that the modified second multiplier value substantially matches a third threshold (e.g., 0), modify the second offset value according an occurrence of a fourth event (e.g., a system clock cycle). The second bit error injection circuit 106 may, in response to a determination that the modified second offset value matches a fourth threshold (e.g., 0), assert a second error injection signal. The second bit error injection circuit 106 may assert a second error pattern based on the second error injection signal. The second error pattern may have a second BER that is different than the BER of the first error pattern 360. Thus, by controlling the amount of time used modifying the second multiplier value and modifying the second offset value, the second BER may be controlled to test whether the receiver defect detection and correction circuit 130 of FIG. 1 can properly detect an unacceptable BER.

Figure 4:
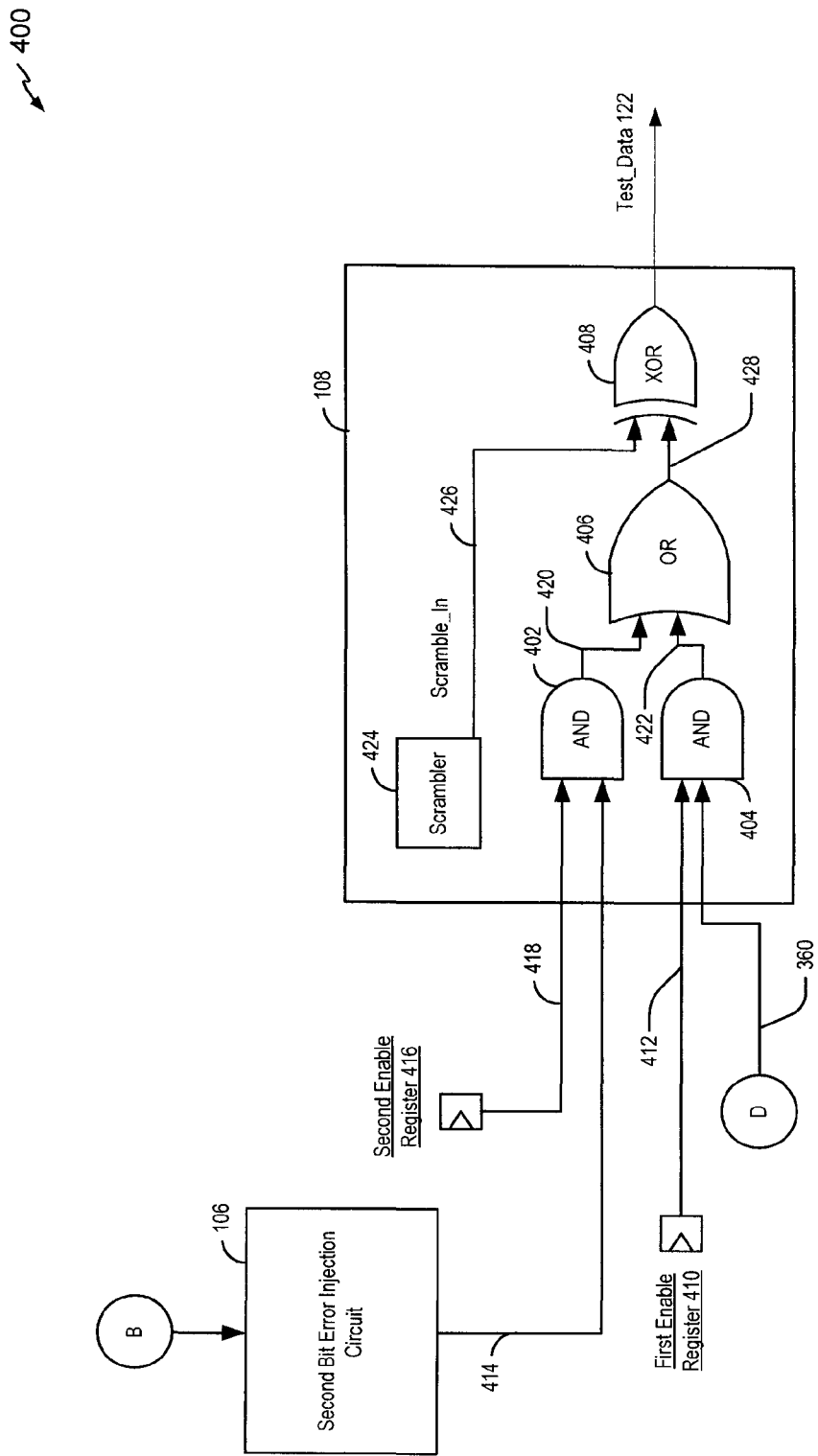
FIG. 4 is a diagram to illustrate a particular embodiment of a transmit circuit of the system of FIG. 1.

Referring to FIG. 4, a particular embodiment of a system 400 including the first transmit circuit 108 of FIG. 1 is illustrated. The first transmit circuit 108 may include AND gates 402 and 404, an OR gate 406, and a XOR gate 408. During operation, the first transmit circuit 108 may receive a first enable signal 412 and the first error pattern 360 (as illustrated by the common indicator "D" in FIGS. 3 and 4) to be processed by the AND gate 404. The first transmit circuit 108 may receive the first enable signal 412 from a first enable register 410. The first transmit circuit 108 may also receive a second enable signal 418 and a second error pattern 414 to be processed by the AND gate 402. The first transmit circuit 108 may receive the second enable signal 418 from a second enable register 416. The first transmit circuit 108 may receive the second error pattern from the second bit error injection circuit 106. An output 420 of the AND gate 402 and an output 422 of the AND gate 404 may be processed by the OR gate 406. An output 428 of the OR gate 406 and a scramble signal 426 (e.g., other test data), supplied by a scrambler 424, may be processed by the XOR gate 408 to form the first test data 122. Thus, the first error pattern 360 and/or the second error pattern 414 may be injected into a bus lane (e.g., the first bus lane 124 of FIG. 1) at the same time or at different times to test the first bus lane 124 as the first error pattern 360 and the second error pattern 414 may each have a respective BER.

Referring to FIG. 5, a particular embodiment of a truth table 500 of the injection state machine 312 of FIG. 3 is illustrated. The injection state machine 312 may operate and transition to different states according to the truth table 500. In FIG. 5, the truth table 500 has an operation state column 502, an interrupt column 504, a threshold comparison column 506, a subsequent value column 508, a next operation state column 510, and an error injection signal column 512.

A value in the operation state column 502 may indicate whether the injection state machine 312 is processing (e.g., incrementing or decrementing) the multiplier value 336 or the offset value 338. A "0" in the operation state column 502 may indicate the first operation state in which the multiplier value 336 is processed, and a "1" may indicate the second operation state in which the offset value 338 is processed. A value in the interrupt column 504 may indicate whether the interrupt 334 is asserted to the injection state machine 312. A "0" in the interrupt column 504 may indicate that the interrupt 334 is not to be asserted to the injection state machine 312, and a "1" in the interrupt column 504 may indicate that the interrupt 334 is to be asserted to the injection state machine 312.

A value in the threshold comparison column 506 may indicate whether the injection state machine 312 has determined that the multiplier value 336 matches the first threshold and/or that the offset value 338 matches the second threshold. A "0" in the threshold comparison column 506 may indicate that the multiplier value 336 (when the injection state machine 312 is in the first operation state) and/or the offset value 338 (when the injection state machine 312 is in the second operation state) does not match the respective threshold. A "1" in the threshold comparison column 506 may indicate that the multiplier value 336 and/or the offset value 338 matches the respective threshold. A value in the subsequent value column 508 may indicate how the injection state machine 312 is to modify the multiplier value 336 and/or the offset value 338 for a subsequent iteration. "CNT" in the subsequent value column 508 may indicate the injection state machine 312 is not to modify the multiplier value 336 and/or the offset value 338. "CNT-1" in the subsequent value column 508 may indicate that the injection state machine 312 is to modify (e.g., decrementing or incrementing) the multiplier value 336 and/or the offset value 338. "Offset" in the subsequent value column 508 may indicate that the injection state machine 312 is to load the offset value 338 into the internal register. "Multiplier" in the subsequent value column 508 may indicate that the injection state machine 312 is to load the multiplier value 336 into the internal register.

A value in the next operation state column 510 may indicate the next operation state that the injection state machine 312 is to be in. When the injection state machine 312 is in the first operation state, a "0" in the next operation state column 510 may indicate that the injection state machine 312 is to stay in the first operation state. When the injection state machine 312 is in the first operation state, a "1" in the next operation state column 510 may indicate that the injection state machine 312 is to transition to the second operation state. When the injection state machine 312 is in the second operation state, a "0" in the next operation state column 510 may indicate that the injection state machine 312 is to transition to the first operation state. When the injection state machine 312 is in the second operation state, a "1" in the next operation state column 510 may indicate that the injection state machine 312 is to stay in the second operation state.

A value in the error injection signal column 512 may indicate whether the error injection signal 358 is to be asserted. A "0" in the error injection signal column 512 may indicate that the error injection signal 358 is not to be asserted. A "1" in the error injection signal column 512 may indicate that the error injection signal 358 is to be asserted. Thus, by controlling the events upon which the multiplier value 336 and/or the offset value 338 are modified, the injection state machine 312 may control the first BER of the first error pattern 360 as the first multiplier value 336 and/or the offset value 338 may contribute to the first BER.

Referring to FIG. 6, a particular embodiment of a look up table 600 of the injection state machine 312 of FIG. 3 to determine the multiplier value 336 is illustrated. The multiplier value 336 may be determined based on the multiplier value selection input 368 and the first portion 112 of the pseudo-random number. A multiplier value selection input column 602 of the look up table 600 may represent different values of the multiplier value selection input 368. A multiplier value decode column 606 of the look up table 600 may represent different multiplier value decoding functions (e.g., Boolean functions) that may use the first portion 112 of the pseudo-random number to generate the multiplier value 336. Each multiplier value decoding function may correspond to a respective value of the multiplier value selection input 368. A multiplier value range column 604 of the look up table 600 may represent different value ranges that the multiplier value 336 may fall within based on the multiplier value selection input 368 and the corresponding multiplier value decoding function.

Each multiplier value decoding function may be configured to generate the multiplier value 336 as a pseudo-random number or a non-pseudo-random number (e.g., a fixed number). For example, when the multiplier value selection input 368 has a value of between "0000" and "0111," the multiplier value 336 generated by the corresponding multiplier value decoding functions may have a pseudo-random value. To illustrate, when the multiplier value selection input 368 is "0001," a corresponding multiplier value decoding function is r(0) & !r(0) & r(2:4). The multiplier value 336 generated by the corresponding multiplier value decoding function may have a bit 0 (r(0) of the first portion 112 of the pseudo-random number as a bit 0 of the multiplier value 336, an inverted bit 0 (!r(0)) of the first portion 112 of the pseudo-random number as a bit 1 of the multiplier value 336, and bits 2 to 4 of the first portion 112 of the pseudo-random number as bits 2 to 4 of the multiplier value 336.

When the multiplier value selection input 368 has a value of between "1000" and "1111," the multiplier value 336 generated by the corresponding multiplier value decoding functions may have a non-pseudo-random value. For example, when the multiplier value selection input 368 is "1001," a corresponding multiplier value decoding function may generate the multiplier value 336 as having a value of "00010," irrespective of the value of the first portion 112 of the pseudo-random number.

The multiplier value decoding functions may be selected such that for the multiplier value selection input 368 having a value in the range between "0000" and "0111," the multiplier value 336 generated by each corresponding multiplier value decoding function may have a uniform pseudo-random distribution and may fall within a range as specified. For example, when the multiplier value selection input 368 is between "0000" and "0100," the corresponding multiplier value 336 may have a common mean value of 15.5 but with progressively narrowing ranges and variation. In another example, when the multiplier value selection input 368 is between "0101" and "0111," each corresponding multiplier value 336 may have the same mean value of 3.5. Thus, by using the different multiplier decoding functions to generate the multiplier value 336 that may contribute to the first BER of the first error pattern 360, the first BER may be controlled.

Referring to FIG. 7, a particular embodiment of a look up table 700 of the injection state machine 312 of FIG. 3 to determine the offset value 338 is illustrated. The offset value 338 may be determined based on the offset value selection input 340 and the first portion 112 of the pseudo-random number. An offset value selection input column 702 may represent different values of the offset value selection input 340. An offset value decode column 706 may represent different offset value decoding functions (e.g., Boolean functions) that may use the first portion 112 of the pseudo-random number to generate the offset value 338. Each offset value decoding function may correspond to a respective value of the offset value selection input 340. An offset value range column 704 may represent different value ranges that the offset value 338 may fall into based on the offset value selection input 340 and the corresponding offset value decoding function.

Each offset value decoding function may be configured to generate the offset value 338 as a pseudo-random number or a non-pseudo-random number (e.g., a fixed number). For example, when the offset value selection input 340 has a value of between "000" and "100," the offset value 338 generated by the corresponding offset value decoding functions may have a pseudo-random value. When the offset value selection input 340 has a value of between "101" and "111," the offset value 338 generated by the corresponding offset value decoding functions may have a non-pseudo-random value. Thus, by using the different offset decoding functions to generate the offset value 338 that may contribute to the first BER of the first error pattern 360, the first BER may be controlled.

Figure 8:
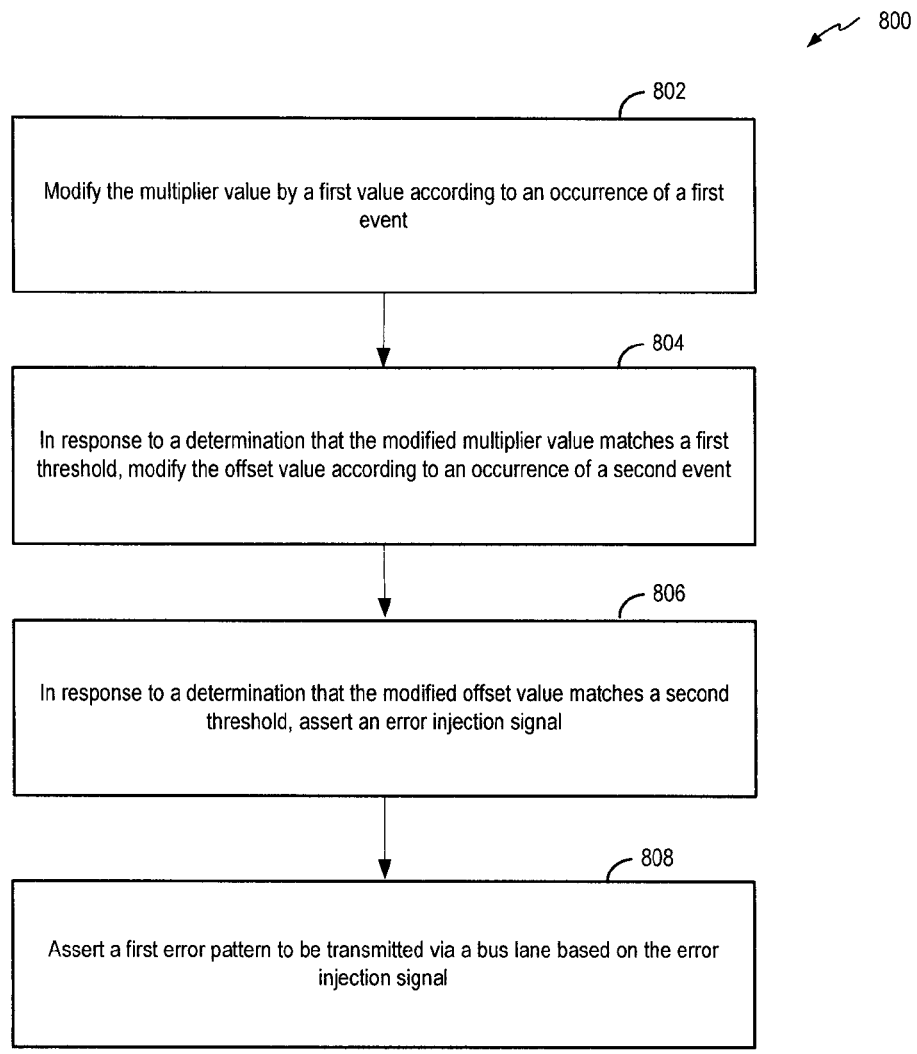
FIG. 8 is a flowchart to illustrate a particular embodiment of a method of testing a bus lane using different bit error rates.

Referring to FIG. 8, a particular embodiment of a method 800 of testing a bus lane (e.g., the bus lane 124 of FIG. 1) using different bit error rates is illustrated. The method 800 may include modifying a multiplier value by a first value according to an occurrence of a first event, at 802. For example, referring to FIG. 3, the injection state machine 312 may decrement or increment the multiplier value 336 according an occurrence of the interrupt 334. The method 800 may also include, in response to a determination that the modified multiplier value matches a first threshold, modifying an offset value according to an occurrence of a second event, at 804. For example, referring to FIG. 3, the injection state machine 312 may decrement or increment the offset value 338 each clock cycle when the multiplier value 336 matches the first threshold. The method 800 may further include, in response to a determination that the modified offset value matches a second threshold, asserting an error injection signal, at 806. For example, referring to FIG. 3, the injection state machine 312 may assert the error injection signal 358 when the offset value 338 matches the second threshold. The method 800 may further include asserting a first error pattern to be transmitted via a bus lane based on the error injection signal, at 808. For example, referring to FIG. 3, the third AND gate 374 may assert the first error pattern 360 based on the error injection signal 358. The method 800 may also be performed at other bit error injection circuits of a system, such as the second bit error injection circuit 106 of FIG. 1. Thus, the method 800 may control a bit error rate associated with the error pattern using the multiplier value and the offset value.

As will be appreciated by one skilled in the art, aspects of the present disclosure may be embodied as a system, a method, a computer program product, or in other manners. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "logic," "module," or "system." Furthermore, aspects of the present disclosure may take the form of a computer program product embodied in one or more computer readable medium(s) having computer-readable program code embodied thereon.

Any combination of one or more computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction performing system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction performing system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA (JAVA is a registered trademark of Sun Microsystems), Smalltalk, C++ or the like and conventional procedural programming languages, such as the "C" programming language or similar programming languages. The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which perform via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which perform on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more performable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Example embodiments may be performed with or without query processing.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The invention claimed is:

1. A method comprising:
    modifying, at a bit error injection circuit, a multiplier value by a first value according to an occurrence of a first event;
    in response to a determination that the modified multiplier value matches a first threshold, modifying, at the bit error injection circuit, an offset value according to an occurrence of a second event;
    in response to a determination that the modified offset value matches a second threshold, asserting, at the bit error injection circuit, an error injection signal; and
    asserting a first error pattern to be transmitted via a bus lane based on the error injection signal.

2. The method of claim 1, further comprising:
    generating, at the bit error injection circuit, the multiplier value based on a multiplier value selection input and a first portion of a pseudo-random number; and
    generating, at the bit error injection circuit, the offset value based on an offset value selection input and the first portion of the pseudo-random number.

3. The method of claim 2, wherein the first error pattern is asserted based on the first portion of the pseudo-random number and a beat disable signal.

4. The method of claim 3, wherein the beat disable signal corresponds to a particular bit of data to be transmitted via the bus lane.

5. The method of claim 2, further comprising:
    generating, at a second bit error injection circuit, a second multiplier value based on a second multiplier value selection input and a second portion of a pseudo-random number;
    modifying, at the second bit error injection circuit, the second multiplier value by a second value according to an occurrence of a third event;
    generating, at the second bit error injection circuit, a second offset value based on a second offset value selection input and the second portion of the pseudo-random number;
    in response to a determination that the modified second multiplier value matches a third threshold, modifying, at the second bit error injection circuit, the second offset value according to an occurrence of a fourth event; and
    in response to a determination that the modified second offset value matches a fourth threshold, asserting a second error injection signal.

6. The method of claim 5, further comprising asserting a second error pattern based on the second error injection signal.

7. The method of claim 6, wherein the first error pattern is different than the second error pattern.

8. The method of claim 1, further comprising performing an XOR operation on the first error pattern with other test data prior to transmitting the first error pattern.

9. The method of claim 1, wherein the first multiplier value selection input is programmable.

10. The method of claim 1, wherein first event is an interrupt.

11. The method of claim 10, wherein the interrupt is asserted based on a bit error rate selection input and an output from a counter.

12. The method of claim 11, wherein the bit error rate selection input is programmable.

13. The method of claim 1, wherein the second event is independent from the first event.

14. The method of claim 1, wherein the second event is a clock cycle.

15. The method of claim 1, wherein the multiplier value is selected from a plurality of ranges, wherein each range of the plurality of ranges has a common mean value.

16. An apparatus comprising:
    a bit error injection circuit configured to:
        modify a multiplier value by a first value according to an occurrence of a first event;
        in response to a determination that the modified multiplier value matches a first threshold, modify an offset value according to an occurrence of a second event;
        in response to a determination that the modified offset value matches a second threshold, assert an error injection signal; and assert an error pattern to be transmitted via a bus lane based on the error injection signal.

17. The apparatus of claim 16, further comprising:
a multiplier value generation circuit configured to output the multiplier value based on a multiplier value selection input and a first portion of a pseudo-random number; and
an offset value generation circuit configured to output the offset value based on an offset value selection input and the first portion of the pseudo-random number.

18. The apparatus of claim 16, wherein the bit error injection circuit is further configured to:
receive the multiplier value from a multiplier value generation circuit; and
receive the offset value from an offset value generation circuit.

19. The apparatus of claim 16, wherein the first event is an interrupt.

20. A computer program product for injecting a bit error on a bus lane, the computer program product comprising a computer readable storage medium having program instructions embodied therewith, wherein the computer readable storage medium is not a transitory signal per se, the program instructions executed by a processor to cause the processor to perform operations comprising:
modifying a multiplier value by a first value according to an occurrence of a first event;
in response to a determination that the modified multiplier value matches a first threshold, modifying an offset value according to an occurrence of a second event;
in response to a determination that the modified offset value matches a second threshold, asserting an error injection signal; and
asserting an error pattern to be transmitted via a bus lane based on the error injection signal.

* * * * *